United States Patent
Sinclair et al.

(10) Patent No.: US 11,021,914 B2
(45) Date of Patent: Jun. 1, 2021

(54) CONNECTOR FOR CONNECTING TO A DOWNHOLE LONGITUDINAL MEMBER

(71) Applicant: BAKER HUGHES, A GE COMPANY, LLC, Houston, TX (US)

(72) Inventors: Ewan Sinclair, Aberdeen (GB);
Gergely Kecskes, Aberdeen (GB)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 189 days.

(21) Appl. No.: 16/305,672

(22) PCT Filed: Jun. 8, 2017

(86) PCT No.: PCT/GB2017/051667
§ 371 (c)(1),
(2) Date: Nov. 29, 2018

(87) PCT Pub. No.: WO2017/212276
PCT Pub. Date: Dec. 14, 2017

(65) Prior Publication Data
US 2020/0325733 A1 Oct. 15, 2020

(30) Foreign Application Priority Data
Jun. 10, 2016 (GB) ..................... 1610172

(51) Int. Cl.
*E21B 17/02* (2006.01)
(52) U.S. Cl.
CPC ................. *E21B 17/02* (2013.01)

(58) Field of Classification Search
CPC .......... E21B 17/02; E21B 31/18; E21B 19/06
See application file for complete search history.

(56) References Cited

U.S. PATENT DOCUMENTS

| | | | | |
|---|---|---|---|---|
| 1,521,789 A | * | 1/1925 | Vincent | E21B 31/18 294/86.26 |
| 2,268,598 A | * | 1/1942 | Kellems | B66C 1/127 294/86.42 |
| 3,133,725 A | | 5/1964 | Lanum | |
| 7,753,111 B1 | | 7/2010 | Reynolds | |
| 2007/0175642 A1 | | 8/2007 | Shampine et al. | |

OTHER PUBLICATIONS

International Search Report issued by the European Patent Office; PCT/GB2017/051667 filed Jun. 8, 2017; ISR dated Jul. 19, 2017; 3 Pages.
Written Opinion of the International Searching Authority; PCT/GB2017/051667 filed Jun. 8, 2017; WO dated Jul. 19, 2017; 6 Pages.

* cited by examiner

*Primary Examiner* — D. Andrews
(74) *Attorney, Agent, or Firm* — Cantor Colburn LLP

(57) ABSTRACT

A connector (10) is provided. The connector (10) is for connecting to a downhole longitudinal member (12). The connector (10) comprises a gripping sleeve (14) defining an internal bore (16) for receiving the longitudinal member (12) therewithin, wherein the gripping sleeve (14) is configured to grip or to increase grip on the longitudinal member (12) by lengthening the gripping sleeve (14). Also provided area system in which the connector (10) is used, and a method of connecting a connector (10) to a downhole longitudinal member (12).

23 Claims, 2 Drawing Sheets

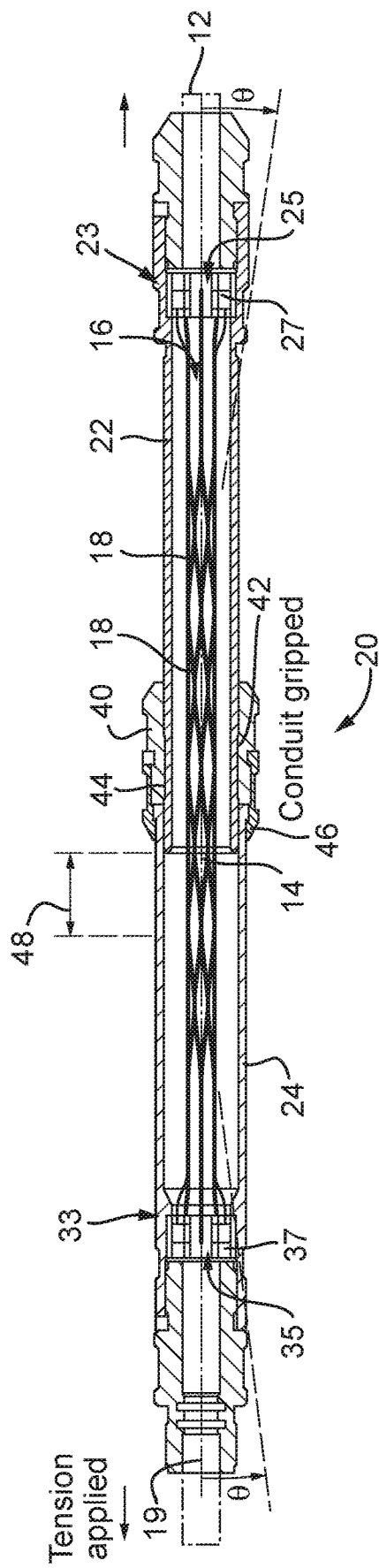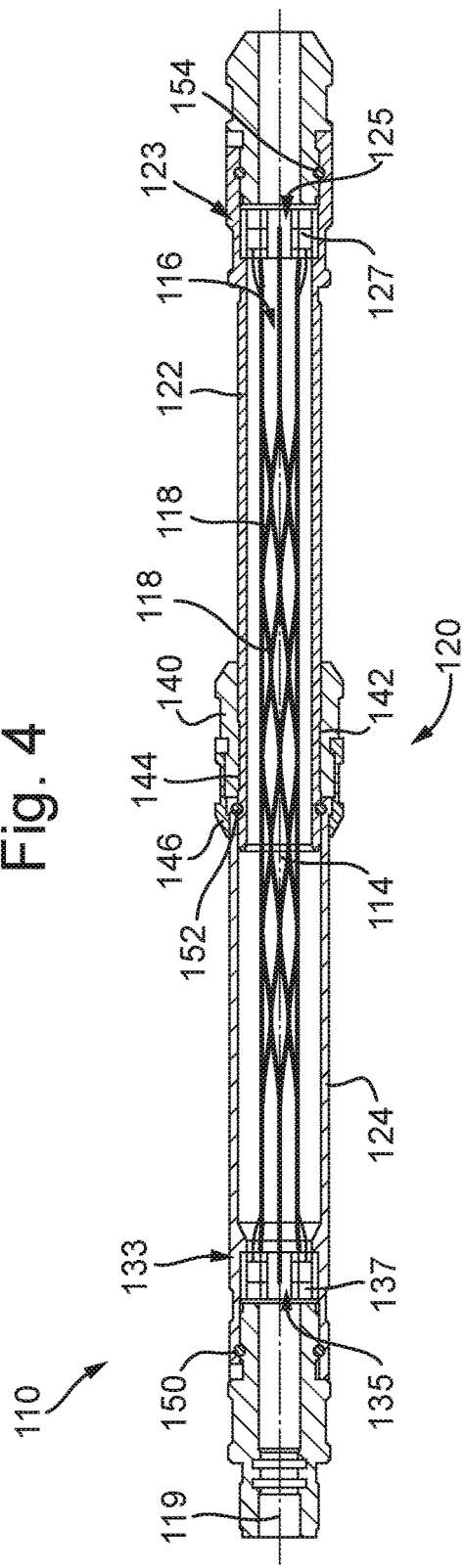

CONNECTOR FOR CONNECTING TO A DOWNHOLE LONGITUDINAL MEMBER

CROSS REFERENCE TO RELATED APPLICATIONS

This is a U.S. National Stage of Application No. PCT/GB2017/051667, filed on Jun. 8, 2017, which claims the benefit of GB Application No. 1610172.7, filed on Jun. 10, 2016, the disclosures of which are incorporated herein by reference.

TECHNICAL FIELD

This disclosure concerns a connector. In particular, but not exclusively, this disclosure concerns examples of downhole connectors, such as for use in subterranean wellbores; and associated methods.

BACKGROUND

In downhole applications, such as in wellbores for subterranean hydrocarbon reserves, it is often desirable to transport equipment or materials using lengths of wire, cable or tubing. For example, in downhole operations, such as exploration, production or intervention, it is common to transport apparatus on strings comprising lengths of wire, such as wireline, or tubing, such as coiled tubing. Typically the apparatus will be attached to the string using a connector and run into the wellbore on the string to a desired location for performing a particular operation. Often the apparatus is positioned at the end of the string as a Bottom Hole Assembly, although some apparatus may be positioned at an intermediate position along the string, depending upon the nature of the operation to be performed downhole.

Often it can be useful to reuse the same longitudinal member for different operations. For example, for one particular downhole operation, it may be useful to attach logging equipment or a sensor at a particular position along the string, whereas for a different downhole operation it may be useful to attach the logging equipment or sensor at a different position of the string; or to connect different apparatus to the string. The apparatus is typically connected at surface to the string at the appropriate position, prior to or during run-in of the string.

It may be an object of one or more examples, embodiments or claims below to address a problem of the prior art.

SUMMARY

According to a first aspect there is provided a connector for connecting to a longitudinal member.

The connector may comprise a downhole connector. The connector may comprise a gripping sleeve defining an internal bore for receiving the longitudinal member therewithin. The gripping sleeve may be configured to increase grip on the longitudinal member as the gripping sleeve is longitudinally lengthened. The gripping sleeve may be configured to increase grip on the longitudinal member by lengthening the gripping sleeve.

The gripping sleeve may function similarly to a Chinese Finger Grip. The gripping sleeve may comprise a Chinese Finger Grip for gripping the longitudinal member. The gripping sleeve may comprise a flexible sleeve configured to radially contract or shrink with axial extension of the gripping sleeve. The gripping sleeve may be configured to reduce the diameter of the internal bore as the gripping sleeve is longitudinally extended in the axial direction of the internal bore.

The gripping sleeve may comprise a filament. The filament may be helically arranged around the internal bore. The filament may be wound. The gripping sleeve may comprise a plurality of filaments. The gripping sleeve may comprise one or more of: a woven mesh; an open mesh; a braid. The internal bore may be defined by the filament/s. The filament may comprise one or more of: a flexible strand; an inelastic strand; a fixed length; an inelastic length; a resilient coating. The filament/s may be arranged to form a sleeve with overlapping portions of filament/s, the overlapping portions defining an angle therebetween. The angle therebetween may vary as the sleeve is axially extended and/or axially contracted. The wrap angle and/or the angle between the filament/s and the longitudinal axis may decrease as the connector grips or increases grip on the longitudinal member. The sleeve may be configured to reduce the wrap angle and/or the angle between the filament/s and the longitudinal axis as the gripping sleeve is extended. The gripping sleeve may be configured to reduce the diameter of the internal bore by reducing the wrap angle between the filament/s.

The connector may comprise a housing for the gripping sleeve. The housing may comprise a first housing portion for housing a gripping sleeve first portion. The gripping sleeve first portion may comprise a gripping sleeve first end portion. The first housing portion may define a first opening. The first housing portion may define a first opening into the sleeve into which the longitudinal member may be received. The first opening may comprise a first axial opening for receiving therethrough the longitudinal member axially along a longitudinal axis parallel to the internal bore of the gripping sleeve. The first housing portion may comprise one or more of: a collar; a ring; an annular flange. The first housing portion may comprise a rigid member. The first housing portion may define a fixed axial opening, such as a fixed diameter axial opening within the first housing portion. The opening defined by the first housing portion may remain the same throughout connection and/or disconnection and/or reconnection. The opening defined by the first housing portion may comprise a larger opening than a longitudinal member to be received therein. For example, a circular collar may comprise a larger inner diameter than an outer diameter of a cylindrical longitudinal member to be received therein. The opening defined by the first housing portion may comprise a larger opening than a minimum diameter defined by the gripping sleeve. The first housing portion may comprise a first external sleeve and the gripping sleeve may comprise a first internal sleeve. At least a portion of the gripping sleeve may be located radially inward of the first housing portion. At least a portion of the gripping sleeve may axially overlap with the first housing portion. The gripping sleeve may be housed radially inside the housing. The housing may not be required to be in contact with the longitudinal member.

The housing may comprise a second housing portion for housing a gripping sleeve second portion. The gripping sleeve second portion may comprise a gripping sleeve second end portion. The gripping sleeve second end portion may be an opposite gripping sleeve end portion to the gripping sleeve first end portion. The second housing portion may define a second opening. The second housing portion may comprise any of the features indicated as being optionally associated with the first housing portion. For example, the second housing portion may comprise one or more of: a collar; a ring; an annular flange. In at least some examples, the first and second housing portions are generally similar, such as comprising similar features mirrored about a plane perpendicular to the longitudinal axis.

The connector may be configured to grip or to increase grip on the longitudinal member by adjusting the first and second housing portions relative to each other. The connector may be configured to axially extend the sleeve by increasing an axial separation between the first and second housing portions. The connector may be configured to axially extend the sleeve by pushing the first and second housing portions axially away from each other.

The first and second housing portions may be axially arranged in the longitudinal direction defined by the gripping sleeve internal bore. The first and second housing portions may be arranged to provide an adjustable axial separation between the gripping sleeve first and second portions. The first and second housing portions may be axially adjustable to selectively vary the axial separation between the gripping sleeve first and second portions. The first and second housing portions may be telescopically arranged, such as to allow the first and second housing portions to slide axially relative to each other.

The connector may comprise an adjustor for adjusting the separation between the gripping sleeve first and second portions. The adjustor may be selectively operated, such as by a user to connect and/or disconnect and/or reconnect the connector. The adjustor may be to axially extend the sleeve by pushing the first and second housing portions axially away from each other. The connector may be configured to generate tension in the gripping sleeve by generating compression in the housing. The adjustor may cooperate with at least one of the first and second housing portions. The adjustor may comprise a screwthread. The connector may be connected or activated by rotating the adjustor relative to at least one of the first and second housing portions. The adjustor may comprise one or more of: a bolt; a nut; a ratchet; a screw. At least one of the first and second housing portions may comprise a screwthread or at least a portion of screwthread for cooperation with the screwthread of the adjustor. In at least some examples the adjustor may be locked in position. For example, once the connector has been sufficiently tightened with satisfactory grip, the adjustor may be locked in position with a lock ring, pin, adhesive or the like. In at least some examples, the adjustor may be indexed or calibrated, such as to provide positions or indications corresponding to one or more of: a gripping force, an internal bore diameter, a relative position of the first and second housing portions. The adjustor may be located radially externally of the gripping sleeve. The adjustor may comprise an internal screwthread and at least one of the first and second housing portions may comprise an external screwthread.

The rotational position of the first and second housing portions may be fixed relative to each other. The rotational positions of the first and second housing portions may be defined about a longitudinal axis, the longitudinal axis defined by the internal bore of the gripping sleeve. The rotational positions of the first and second housing portions may remain fixed relative to each other whilst allowing an axial separation of the first and second collars to be varied. The rotational positions of the first and second housing portions may remain fixed relative to each other for all axial separations of the first and second housing portions. For example, rotation of the first housing portion relative to the second housing portion may be prevented, such as by a spline, key or the like. For instance, in at least some examples the first housing portion may be keyed, directly or indirectly, to the second housing portions. The gripping sleeve first and second portions may be fixed to the respective first and second housing portions, such as via first and second collars, the first and second collars being singularly fixed to the respective first and second housing portions.

The connector may be configured to increase grip by longitudinally extending the sleeve. The connector may be configured to grip the longitudinal member or to increase grip on the longitudinal member without necessarily exerting a longitudinal force on the longitudinal member. The connector may be configured to grip or to increase grip on the longitudinal member whilst exerting no net longitudinal force on the longitudinal member. The connector may be configured to grip or to increase grip on the longitudinal member without pulling on the longitudinal member. The connector may be configured to grip or to increase grip on the longitudinal member without requiring pulling on the longitudinal member. The connector may be configured to apply a compressive grip to the longitudinal member within the bore, the compressive grip increasing as the connector is longitudinally extended.

The connector may be configured to apply a distributed grip to the longitudinal member within the internal bore. The connector may be configured to apply a distributed grip to the longitudinal member within the internal bore. The grip may be distributed longitudinally along the internal bore. The grip may be distributed circumferentially around the internal bore. The gripping sleeve may be configured to apply a maximum gripping force. The connector may be configured to apply a maximum gripping force at a middle axial portion of the gripping sleeve. The connector may be configured to provide a gradually increasing gripping force along an axially length of the gripping sleeve. Providing a gradually increasing gripping force may reduce local stresses and/or deformations in the longitudinal member and/or the gripping sleeve. The gripping sleeve may provide a distributed stress along and/or around the internal bore. The gripping sleeve may be configured to provide a distributed stress along and/or around the internal bore so as to minimise deformation of a longitudinal member located therein.

The gripping sleeve may provide a similar gripping force to the longitudinal member wherever the gripping sleeve is in contact with the longitudinal member. For example, where the longitudinal member is of a single fixed diameter, flexible filaments of the gripping sleeve may adapt to the form of the longitudinal member to apply an even pressure along the length and around the circumference of the longitudinal member for the portion of the longitudinal member that is in contact with the gripping sleeve.

The connector may be configured to apply an increased grip to the longitudinal member by longitudinally extending the connector without necessarily applying tension to the longitudinal member. The connector may be configured to apply an increased grip to the longitudinal member by longitudinally extending the connector without requiring tension to be applied to the longitudinal member. The connector may be configured to grip the longitudinal member without necessarily requiring any pull of the longitudinal member. The connector may be configured to grip or to increase grip of the longitudinal member by applying a force/s to an exterior to the gripping sleeve. The connector may be configured to grip or to increase grip of the longitudinal member without requiring a longitudinal force to be applied to the interior of the gripping sleeve. In contrast to a Chinese Finger Grip wherein the longitudinal member (e.g. finger) is used to grip or to increase grip by pulling on the interior of the Chinese Finger Grip, at least some examples of the connector of the present application do not require any longitudinal force/s to be applied internally, such as within the internal bore.

Additionally or alternatively, the connector may be configured to apply an increased grip to the longitudinal member if longitudinal tension is applied to the longitudinal member, such as longitudinal pulling of the longitudinal member away from the connector. The connector may be configured to apply an increased grip to the longitudinal member if longitudinal tension is applied to the longitudinal member in either longitudinal direction. The increased grip may comprise an increased gripping force, such as an increased compressive force on the longitudinal member. The connector may apply a gripping force to the longitudinal member that increases with longitudinal tension applied to the longitudinal member. The connector's gripping force may increase in proportion to the tension applied to the longitudinal member. The connector's gripping force may be directly proportional to the tension applied to the longitudinal member.

In at least some examples, the grip of the gripping sleeve on the longitudinal member is maintained when tension in or of the longitudinal member is decreased. In contrast to a Chinese Finger Grip that can be released by reducing tension in the longitudinal member (e.g. pushing a finger into the Chinese Finger Grip), examples of the present disclosure maintain grip and do not release the longitudinal member when tension in or of the longitudinal member is decreased.

The connector may be activable independently of tension in the longitudinal member. Accordingly, the connector may be activable irrespective of load or tension in the longitudinal member. Activable may comprise connectable. The connector may be activable when the longitudinal member is under tension, optionally under maximum tension, and/or when the longitudinal member is not under tension (e.g. unladen, under compression, relaxed, free). The connector may be activable independently of tension, pulling or movement of the longitudinal member in either and/or both longitudinal direction/s.

Likewise, the connector may be activable independently of compression in the longitudinal member.

The connector may be deactivable independently of tension in the longitudinal member. Deactivable may comprise disconnectable. For example, the connector may be deactivated so as to become disconnected from the longitudinal member within the internal bore.

The connector may be deactivable whilst tension in the longitudinal member can be maintained. For example, the connector can be disconnected from the longitudinal member without requiring any change in tension in the longitudinal member. The connector may be configured to disconnect or decrease grip by reversing any of the features of the connector to grip or increase grip. The connector may be configured to disconnect or to decrease grip on the longitudinal member by adjusting the first and second housing portions relative to each other. The connector may be configured to axially shorten the gripping sleeve by decreasing an axial separation between the first and second housing portions. The connector may be configured to axially shorten the sleeve by pulling the first and second housing portions axially towards each other.

The connector may be reconnectable. The connector may be reconnectable to the longitudinal member. The connector may be reconnectable to the longitudinal member without requiring removal of the longitudinal member from within the internal bore. For example, where the connector is first connected at a first intermediate position on the longitudinal member, the connector may be disconnected at the first intermediate position and repositioned at a second intermediate position along the longitudinal member and reconnected to the longitudinal member. For instance, in at least some examples, the longitudinal member may be partially retrieved such that the connector at a first intermediate position on the longitudinal member is retrieved to surface, whilst a portion of the longitudinal member remains downhole (i.e. the portion of the longitudinal member downhole of the first intermediate position). Allowing the connector to be connected and/or disconnected and/or reconnected without requiring removal of the longitudinal member from within the internal bore may allow disconnection and/or (re)connection without retrieving all of the longitudinal member, such as saving time, effort and expense compared to requiring full retrieval of the longitudinal member (e.g. toolstring) to surface. Allowing the connector to be connected and/or disconnected and/or reconnected without requiring removal of the longitudinal member from within the internal bore may allow disconnection and/or (re)connection of the connector without removing or disconnecting other apparatus from the longitudinal member. For example, where the connector is mounted on a longitudinal member with a large diameter joint or tool, such as a string with a large BHA (e.g. for drilling, reaming or the like), stabiliser, valve, or the like, then the connector may be disconnectable, movable and reconnectable without requiring the removal of the BHA, stabiliser, valve or the like. The connector may be reconnectable to a second longitudinal member, the second longitudinal member being different to a first longitudinal member connected to previously.

The deactivated gripping sleeve may allow the passing of the longitudinal member through the internal bore in both axial directions.

The connector may be a downhole longitudinal member connector. The connector may be for downhole connection. Additionally, or alternatively, the connector may be for surface connection/s. For example, the connector may be configured to attach the longitudinal member, such as to suspend the longitudinal member at or from a wellhead. The connector may be configured to apply a braking force to the longitudinal member. The connector may comprise a cablehead.

The connector may be configured to suspend apparatus or equipment from the longitudinal member. The apparatus or equipment may comprise one or more of: a further longitudinal member; downhole apparatus; a toolstring. The connector may be configured to replace slips. The connector may perform a function of slips.

In at least some examples, the connector may be laterally removable and/or laterally mountable. Lateral movement may be transverse or perpendicular to a longitudinal axis defined by the internal bore, such as along a central axis of the longitudinal member to be received therein. The connector may be configured to receive the longitudinal member laterally. Accordingly the connector may be laterally insertable over the longitudinal member. The connector may comprise a longitudinal opening for laterally accessing the internal bore. For example, the connector may comprise an open channel along a longitudinal length, the channel being open at least in the deactivated configuration. The longitudinal opening may comprise a slit. The longitudinal opening may be closed in the activated configuration. The gripping sleeve may comprise a corset. The gripping sleeve may be circumferentially closable around the longitudinal member after radial insertion of the gripping sleeve over the longitudinal member. The longitudinal opening may be closed by connecting the two side portions of the gripping sleeve adjacent the longitudinal opening (e.g. running along either side of the longitudinal opening), such as using one or more fasteners (e.g. eyelets, hooks, bolts). The longitudinal opening may be closed by winding the filament/s around the longitudinal member located in the internal bore, such as by weaving at least a portion of the mesh or braid of the gripping sleeve around the longitudinal member.

Providing a connector that is laterally removable and/or laterally mountable may allow the removal and/or mounting and/or remounting of the connector onto the longitudinal member without requiring any insertion of an end portion of the longitudinal member into the connector. Accordingly, the connector may be removable and/or mountable at any position along the longitudinal member and/or at any stage during run-in (or retrieval).

The connector may be configured to accommodate a longitudinal member of variable cross-section or variable diameter. For example, the internal bore may accommodate a variable diameter or variable longitudinal member cross-section in the deactivated and/or activated configuration. The internal bore may be for receiving a transition portion of the longitudinal member/s. The sleeve may be configured to accommodate a plurality of cross-sectional profiles and/or diameters in the internal bore in the activated configuration. Accordingly, the connector may be connected over a knuckle, joint, valve or other profile change in the longitudinal member/s. The sleeve may be configured to accommodate a plurality of cross-sectional profiles and/or diameters in the internal bore in the deactivated configuration. Accordingly, the connector may be moved over a knuckle, joint, valve or other profile change in the longitudinal member/s; such as by sliding the connector axially relative to the longitudinal member (or vice versa).

The connector may be configured to accommodate longitudinal members of different cross-section or different diameter. For example, the connector may comprise a first internal bore diameter in a first activated configuration for use with a first longitudinal member in first application, such as a first downhole operation; and the connector may comprise a second internal bore diameter in a second activated configuration for use with a second longitudinal member in second application, such as a second downhole operation. The first longitudinal member may comprise a different diameter (e.g. different outer diameter) than the second longitudinal member.

The connector may grip the longitudinal member longitudinally. The grip applied by the connector may allow a transmission of longitudinal forces between the connector and the longitudinal member. The longitudinal forces may be transmitted in both longitudinal directions (e.g. both uphole and downhole). Equal longitudinal forces may be transmitted in both longitudinal directions (i.e. the connector may provide bidirectional longitudinal grip of similar magnitude in each direction). The longitudinal forces may be tensile and/or compressive.

Additionally, or alternatively, the connector may grip the longitudinal member rotationally. The grip applied by the connector may allow a transmission of torque between the connector and the longitudinal member. The torque may be transmitted in both rotational directions (e.g. both clockwise and counter-clockwise). Equal torque may be transmitted in both rotational directions (i.e. the connector may provide bidirectional rotational grip of similar magnitude in each direction).

The connector may comprise a connector for connecting a device or apparatus to the longitudinal member. For example, the connector may comprise a downhole tool connector for connecting a downhole tool to the longitudinal member, such as connecting a downhole tool in or to a downhole toolstring.

Additionally, or alternatively, the connector may comprise a connector for connecting a first longitudinal member to a second longitudinal member, such as at end portions of each of the longitudinal members. For example, the connector may be for connecting two longitudinal members together, such as to effectively provide a longitudinal member of increased length. The first and second longitudinal members may be of a similar type. Alternatively, the connector may be for connecting a first longitudinal member of a first type to a second longitudinal member, the second longitudinal member being of a dissimilar type to the first type. For example, the first and second longitudinal members may comprise a conductive and a non-conductive longitudinal member respectively. The first and second longitudinal members may be of similar diameter. Alternatively, the first and second longitudinal members may be of dissimilar diameter. The first and second longitudinal members may be of similar cross-sectional profile. Alternatively, the first and second longitudinal members may be of dissimilar cross-sectional profile. For example, the connector may be for connecting a circular cross-sectional profile to an oval cross-sectional profile.

The connector may be configured to connect two longitudinal members of similar cross-sectional profile and similar diameter; and configured to connect two longitudinal members of dissimilar cross-sectional profile or dissimilar diameter. For example, the connector may be adaptable to accommodate similar longitudinal members and also to accommodate dissimilar longitudinal members.

The connector may be self-adapting, automatically adjusting to accommodate similar cross-sectional profiles and/or dissimilar cross-sectional profiles.

The internal bore may comprise a throughbore. Alternatively, in at least some examples, the internal bore may comprise a blind bore. For example, the connector may be connectable at a terminal or end point of a longitudinal member.

The longitudinal member may comprise one or more of: a cable, a tube, a support member, a downhole longitudinal member, an elongate member, a wire, a hollow longitudinal member; a conduit; a pipe; a coiled tubing; a slickline; a wireline; a tubular; a downhole tool.

A material of the gripping sleeve may be selected according to the longitudinal member to be gripped. The gripping sleeve may comprise a material and/or a coating configured to grip the longitudinal member. The gripping sleeve may comprise a material and/or coating to locally deform the longitudinal member at (only) a microscopic scale; such as a sub-millimetre scale. The filament/s of the gripping sleeve may comprise one or more of: a resilient material; a resilient coating: a high-friction material; a high-friction coating; an abrasive; a diamond-based material; a crystalline material; saw wire; metal; steel; diamond wire; diamond dust; diamond impregnation.

The connector may comprise a fluid passage. For example, the connector may define a sealed fluid passage. Where the connector is for connecting two longitudinal members, such as two conduits, the provision of a sealed passage by the connector may enable increased functionality. For example, the connector may provide a sealed connection between two lengths of tubular or coiled tubing, or between a length of coiled tubing and a fluid apparatus, such as a downhole valve, motor, or the like. Likewise, the connector may function as a sealing sleeve, such as to seal an opening, leak, valve or the like in a longitudinal member located in the internal bore. The connector may comprise at least one seal, such as an O-ring, D-ring, X-ring, gasket or the like.

According to a further aspect, there is provided a method of connecting a connector to a longitudinal member. The connector and longitudinal member may comprise the longitudinal member and the connector of any other aspect, example, embodiment or claim.

The method may comprise connecting a downhole connector. The method may comprise receiving the longitudinal member within an internal bore of a gripping sleeve of the connector. The method may comprise gripping the longitudinal member within the internal bore. The method may comprise increasing grip on the longitudinal member as the gripping sleeve is longitudinally lengthened. The method may comprise increasing grip on the longitudinal member by reducing an internal diameter of the internal bore by lengthening the gripping sleeve. The method may comprise lengthening the gripping sleeve without applying any net axial force to the longitudinal member. The method may comprise increasing grip on the longitudinal member independently of tension in the longitudinal member.

The method may comprise increasing an axial separation between a first housing portion and a second housing portion of the connector, the first and second housing portions being attached to first and second portions of the gripping sleeve respectively. The method may comprise pushing apart the first and second housing portions. The method may comprise screwing an adjustor that cooperates with at least one of the first and second housing portions to push apart the first and second housing portions to increase grip on the longitudinal member.

The method may comprise disconnecting the connector from the longitudinal member by moving the first and second housing portions axially towards each other. The method may comprise decreasing grip on the longitudinal member independently of tension in the longitudinal member.

The method may comprise moving the connector in a disconnected configuration axially along the longitudinal member, such as sliding the connector relative to the longitudinal member. The method may comprise moving the connector without removing the longitudinal member from the internal bore.

The method may comprise reconnecting the connector to the longitudinal member. The method may comprise reconnecting the connector to the longitudinal member without removing the longitudinal member from the internal bore.

According to a further aspect there is provided a method disconnecting a connector from a longitudinal member. The method may comprise any of the features of disconnection of any other aspect, example, embodiment or claim.

According to a further aspect there is provided a method reconnecting a connector to a longitudinal member. The method may comprise any of the features of reconnection of any other aspect, example, embodiment or claim.

According to a further aspect, there are provided at least some examples of a system comprising the longitudinal member and the connector of any other aspect, example, embodiment or claim.

The system may comprise a plurality of connectors. The plurality of connectors may be located along the length of a single longitudinal member. The system may comprise a downhole string or at least a portion thereof.

The invention includes one or more corresponding aspects, examples, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the connector of one aspect may comprise features of any other aspect). Optional features as recited in respect of a method may be additionally applicable to an apparatus or device; and vice versa.

In addition, corresponding means for performing one or more of the discussed functions are also within the present disclosure.

It will be appreciated that one or more embodiments/aspects may be useful in connecting to a longitudinal member.

The above summary is intended to be merely exemplary and non-limiting.

Various respective aspects and features of the present disclosure are defined in the appended claims.

It is an aim of certain embodiments of the present disclosure to solve, mitigate or obviate, at least partly, at least one of the problems and/or disadvantages associated with the prior art. Certain embodiments aim to provide at least one of the advantages described below.

BRIEF DESCRIPTION OF THE DRAWINGS

These and other aspects of the present invention will now be described, by way of example only, with reference to the accompanying drawings, in which:

FIG. 3 is a further cross-sectional view of the connector of FIG. 1 in a connected, activated configuration; and FIG. 4 is a cross-sectional view of a connector in accordance with a further example.

DETAILED DESCRIPTION

Figure 1:
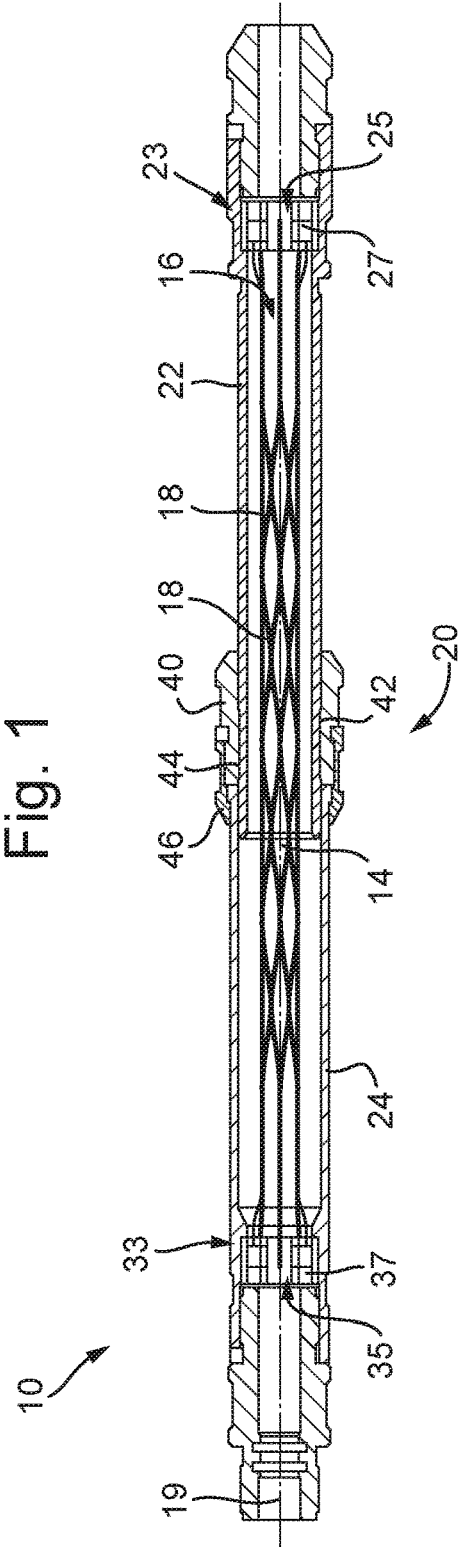
FIG. 1 is a cross-sectional view of a connector in accordance with a first example.

Referring first to FIG. 1, there is shown a connector 10 for connecting to a longitudinal member 12.

Here, the connector 10 comprises a downhole connector. The connector 10 comprises a gripping sleeve 14 defining an internal bore 16 for receiving the longitudinal member 12 therewithin. The gripping sleeve 14 is configured to increase grip on the longitudinal member 12 as the gripping sleeve 14 is longitudinally lengthened. The gripping sleeve 14 is configured to increase grip on the longitudinal member 12 by lengthening the gripping sleeve 14.

The gripping sleeve 14 comprises a Chinese Finger Grip for gripping the longitudinal member 12, comprising a flexible sleeve configured to radially contract or shrink with axial extension of the gripping sleeve 14. The gripping sleeve 14 is configured to reduce the diameter of the internal bore 16 as the gripping sleeve 14 is longitudinally extended in the axial direction of the internal bore 16.

Figure 2:
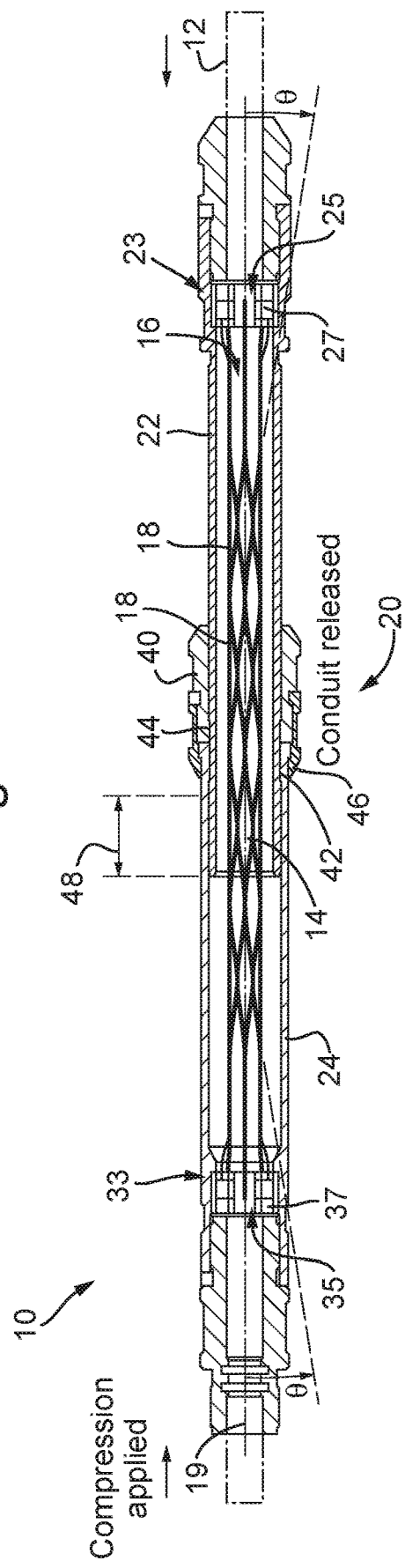
FIG. 2 is a further cross-sectional view of the connector of FIG. 1 in a disconnected, deactivated configuration.

As shown here, the gripping sleeve 14 comprises a plurality of filaments 18 each helically wound into a braid to form an open woven mesh defining the internal bore 16. The filaments 18 comprise flexible inelastic strands of fixed length. The filaments 18 are arranged to form the gripping sleeve 14 with overlapping portions of filaments 18, the overlapping portions defining an angle θ therebetween. The angle therebetween varies as the gripping sleeve 14 is axially extended and/or axially contracted, as can be seen in FIGS. 2 and 3. The wrap angle θ and the angle between the filaments 18 and the longitudinal axis 19 decreases as the connector 10 grips or increases grip on the longitudinal member 12, as can be seen when transitioning from the configuration of FIG. 2 to FIG. 3. The gripping sleeve 14 is configured to reduce the diameter of the internal bore 16 by reducing the wrap angle between the filaments 18.

The connector 10 comprises a housing 20 for the gripping sleeve 14. The housing 20 comprises a first housing portion 22 for housing a gripping sleeve 14 first portion 23, which is a gripping sleeve first end portion as shown here. The first housing portion 22 defines a first opening 25 into the sleeve into which the longitudinal member 12 is received axially along the longitudinal axis 19 parallel to the internal bore 16 of the gripping sleeve 14. Here, the first housing portion 22 comprises a rigid collar 27 to which the filaments 18 are anchored, such that the first opening 25 is a fixed diameter axial opening within the first housing portion 22 that remains the same throughout connection and disconnection and reconnection. As visible in FIGS. 2 and 3, the opening 25 defined by the first housing portion 22 comprises a larger opening than the longitudinal member 12 to be received therein. In particular, the circular collar 27 comprises a larger inner diameter than an outer diameter of the cylindrical longitudinal member 12 to be received therein. Here, the opening 25 defined by the first housing portion 22 also comprises a larger opening than a minimum diameter defined by the gripping sleeve 14, as visible in FIG. 3. Here, the first housing portion 22 comprises a first external sleeve and the gripping sleeve 14 comprises a first internal sleeve. At least a portion of the gripping sleeve 14 is located radially inward of the first housing portion 22 and axially overlaps with the first housing portion 22 such that the gripping sleeve 14 is housed radially inside the housing 20; and the housing 20 is not required to be in contact with the longitudinal member 12; and normally does not contact the longitudinal member 12.

The housing 20 comprises a second housing portion 24 for housing a gripping sleeve second portion 33, which here is a gripping sleeve second end portion. The gripping sleeve second end portion is an opposite gripping sleeve end portion to the gripping sleeve first end portion. The first and second housing portions 22, 24 are generally similar, comprising similar features mirrored about a plane perpendicular to the longitudinal axis 19. Accordingly, the second housing portion 24 defines a second opening 35 and has a rigid collar 37 to which the filaments 18 are anchored.

The connector 10 is configured to grip or to increase grip on the longitudinal member 12 by adjusting the first and second housing portions 22, 24 relative to each other. The connector 10 is configured to axially extend the gripping sleeve 14 by increasing an axial separation between the first and second housing portions 22, 24, axially extending the sleeve 14 by pushing the first and second housing portions 22, 24 axially away from each other.

The first and second housing portions 22, 24 are axially arranged in the longitudinal direction defined by the gripping sleeve internal bore 16 and are arranged to provide an adjustable axial separation between the gripping sleeve first and second portions 23, 33, the first and second housing portions 22, 24 are telescopically arranged, allowing the first and second housing portions 22, 24 to slide axially relative to each other.

The connector 10 comprises an adjustor 40 for adjusting the separation between the gripping sleeve 14 first and second portions. The adjustor 40 is selectively operated, such as by a user to connect and/or disconnect and/or reconnect the connector 10. The adjustor 40 is to axially extend the sleeve 14 by pushing the first and second housing portions 22, 24 axially away from each other. The connector 10 is configured to generate tension in the gripping sleeve 14 by generating compression in the housing 20. The adjustor 40 cooperates with at least one of the first and second housing portions. The connector 10 is connected or activated by rotating the adjustor 40 relative to at least one of the first and second housing portions 22, 24. The adjustor 40 is located radially externally of the gripping sleeve 14 and comprises a nut with an internal screwthread 42 that cooperates with a corresponding external screwthread 44 of the first housing portion 22. The adjustor 40 is mounted to the second housing portion 24 by a mounting ring 46 that is fixed to the second housing portion 24. Rotation of the adjustor 40 about the longitudinal axis 19 forces the housing portions 22, 24 apart or together, such as illustrated by the distance 48 in FIGS. 2 and 3. In at least some examples (not shown), the adjustor 40 is locked in position. For example, once the connector 10 has been sufficiently tightened with satisfactory grip, the adjustor 40 is locked in position with a lock ring, pin, adhesive or the like. In at least some examples, the adjustor 40 is indexed or calibrated, such as to provide positions or indications corresponding to one or more of: a gripping force, an internal bore 16 diameter, a relative position of the first and second housing portions 22, 24.

The rotational position about the longitudinal axis 19 of the first and second housing portions 22, 24 is fixed relative to each other, whilst allowing an axial separation of the first and second collars 27, 37 to be varied. The rotational positions of the first and second housing portions 22, 24 remains fixed relative to each other for all axial separations of the first and second housing portions. Here, the first housing portion 22 is keyed directly to the second housing portion 24. The gripping sleeve first and second portions 23, 33 are fixed to the respective first and second housing portions 22, 24 via the first and second collars 27, 37, the first and second collars 27, 37 being singularly fixed to the respective first and second housing portions 22, 24.

The connector 10 is configured to increase grip by longitudinally extending the sleeve 14. The connector 10 is configured to grip the longitudinal member 12 or to increase grip on the longitudinal member 12 without necessarily exerting a longitudinal force on the longitudinal member 12. The connector 10 is configured to grip or to increase grip on the longitudinal member 12 whilst exerting no net longitudinal force on the longitudinal member 12. The connector 10 is configured to grip or to increase grip on the longitudinal member 12 without pulling on the longitudinal member 12. The connector 10 is configured to grip or to increase grip on the longitudinal member 12 without requiring pulling on the longitudinal member 12. The connector 10 is configured to apply a compressive grip to the longitudinal member 12 within the bore 16, the compressive grip increasing as the connector 10 is longitudinally extended, as illustrated in the transition from FIG. 2 to FIG. 3.

The connector 10 is configured to apply a distributed grip to the longitudinal member 12 within the internal bore 16. The grip is distributed longitudinally along the internal bore 16 and circumferentially around the internal bore 16. The connector 10 is configured to apply a maximum gripping force at a middle axial portion of the gripping sleeve 14. The connector 10 is configured to provide a gradually increasing gripping force along an axial length of the gripping sleeve 14. Providing a gradually increasing gripping force reduces local stresses and deformations in the longitudinal member 12 and the gripping sleeve 14. The gripping sleeve 14 provides a distributed stress along and around the internal bore 16. The gripping sleeve 14 is configured to provide a distributed stress along and around the internal bore 16 so as to minimise deformation of the longitudinal member 12 located therein.

The gripping sleeve 14 provides a similar gripping force to the longitudinal member 12 wherever the gripping sleeve 14 is in contact with the longitudinal member 12. For example, where the longitudinal member 12 is of a single fixed diameter as shown here, the flexible filaments 18 of the gripping sleeve 14 adapt to the form of the longitudinal member 12 to apply an even pressure along the length and around the circumference of the longitudinal member 12 for the portion of the longitudinal member 12 that is in contact with the gripping sleeve 14.

The connector 10 is configured to apply an increased grip to the longitudinal member 12 by longitudinally extending the connector 10 without necessarily applying tension to the longitudinal member 12. The connector 10 is configured to apply an increased grip to the longitudinal member 12 by longitudinally extending the connector 10 without requiring tension to be applied to the longitudinal member 12. The connector 10 is configured to grip the longitudinal member 12 without necessarily requiring any pull of the longitudinal member 12. The connector 10 is configured to grip or to increase grip of the longitudinal member 12 by applying a force to an exterior to the gripping sleeve 14. The connector 10 is configured to grip or to increase grip of the longitudinal member 12 without requiring a longitudinal force to be applied to the interior of the gripping sleeve 14. In contrast to a Chinese Finger Grip wherein the longitudinal member 12 (e.g. finger) is used to grip or to increase grip by pulling on the interior of the Chinese Finger Grip, at least some examples of the connector 10 of the present application do not require any longitudinal forces to be applied internally, such as within the internal bore 16.

However, here, the connector 10 is configured to also apply an increased grip to the longitudinal member 12 if longitudinal tension is applied to the longitudinal member 12, such as longitudinal pulling of the longitudinal member 12 away from the connector 10. The connector 10 is configured to apply an increased grip to the longitudinal member 12 if longitudinal tension is applied to the longitudinal member 12 in either longitudinal direction. The increased grip comprises an increased gripping force, such as an increased compressive force on the longitudinal member 12. The connector 10 applies a gripping force to the longitudinal member 12 that increases with longitudinal tension applied to the longitudinal member 12. The connector's 10 gripping force increases in proportion to the tension applied to the longitudinal member 12, being directly proportional to the tension applied to the longitudinal member 12.

The grip of the gripping sleeve 14 on the longitudinal member 12 is maintained when tension in or of the longitudinal member 12 is decreased. In contrast to a Chinese Finger Grip that can be released by reducing tension in the longitudinal member 12 (e.g. pushing a finger into the Chinese Finger Grip), the connector here maintains grip and does not release the longitudinal member 12 when tension in or of the longitudinal member 12 is decreased. For example, the connector 10 grips the longitudinal member 12 in the activated configuration of FIG. 3 irrespective of tension in the longitudinal member 12, or between the longitudinal member 12 and the connector 10.

The connector 10 is activable independently of tension in the longitudinal member 12. Accordingly, the connector 10 is activable irrespective of load or tension in the longitudinal member 12. Activable comprises connectable. The connector 10 is activable when the longitudinal member 12 is under tension, optionally under maximum tension, and/or when the longitudinal member 12 is not under tension (e.g. unladen, under compression, relaxed, free). The connector 10 is activable independently of tension, pulling or movement of the longitudinal member 12 in either and both longitudinal directions.

Likewise, the connector 10 is activable independently of compression in the longitudinal member 12.

The connector 10 is deactivable independently of tension in the longitudinal member 12. Deactivable comprises disconnectable. For example, the connector 10 is deactivated so as to become disconnected from the longitudinal member 12 within the internal bore 16, as shown by transitioning from the configuration of FIG. 3 to the configuration of FIG. 2.

The connector 10 is deactivable whilst tension in the longitudinal member 12 can be maintained. For example, the connector 10 can be disconnected from the longitudinal member 12 without requiring any change in tension in the longitudinal member 12. The connector 10 is configured to disconnect or decrease grip by reversing any of the features of the connector 10 to grip or increase grip. The connector 10 is configured to disconnect or to decrease grip on the longitudinal member 12 by adjusting the first and second housing portions 22, 24 relative to each other. The connector 10 is configured to axially shorten the gripping sleeve 14 by decreasing an axial separation between the first and second housing portions 22, 24. The connector 10 is configured to axially shorten the sleeve by pulling the first and second housing portions 22, 24 axially towards each other, as shown by transitioning from the configuration of FIG. 3 to the configuration of FIG. 2.

The connector 10 is reconnectable to the longitudinal member 12. The connector 10 is reconnectable to the longitudinal member 12 without requiring removal of the longitudinal member 12 from within the internal bore 16. For example, where the connector 10 is first connected at a first intermediate position on the longitudinal member 12, the connector 10 is disconnected at the first intermediate position and repositioned at a second intermediate position along the longitudinal member 12 and reconnected to the longitudinal member 12. The connector 10 is reconnectable. For instance, in at least some examples, the longitudinal member 12 can be partially retrieved such that the connector 10 at a first intermediate position on the longitudinal member 12 is retrieved to surface, whilst a portion of the longitudinal member 12 remains downhole (i.e. the portion of the longitudinal member 12 downhole of the first intermediate position). Allowing the connector 10 to be connected and/or disconnected and/or reconnected without requiring removal of the longitudinal member 12 from within the internal bore 16 allows disconnection and/or (re)connection without retrieving all of the longitudinal member 12, such as saving time, effort and expense compared to requiring full retrieval of the longitudinal member 12 (e.g. toolstring) to surface. Allowing the connector 10 to be connected and/or disconnected and/or reconnected without requiring removal of the longitudinal member 12 from within the internal bore 16 allows disconnection and/or (re)connection of the connector 10 without removing or disconnecting other apparatus from the longitudinal member 12. For example, where the connector 10 is mounted on a longitudinal member 12 with a large diameter joint or tool, such as a string with a large BHA (e.g. for drilling, reaming or the like), stabiliser, valve, or the like, then the connector 10 is disconnectable, movable and reconnectable without requiring the removal of the BHA, stabiliser, valve or the like. It will be appreciated that the connector may be reconfigured between the configurations of FIGS. 2 and 3 repeatedly to connect, disconnect and reconnect the connector as desired. When disconnected, in the configuration of FIG. 2, the deactivated gripping sleeve 14 allows the passing of the longitudinal member 12 through the internal bore 16 in both axial directions. Accordingly the connector can be sequentially reconnected at one or different positions along the longitudinal member 12.

The connector 10 is configured to accommodate a longitudinal member 12 of variable cross-section or variable diameter. For example, the internal bore 16 accommodatse a variable diameter or variable longitudinal member 12 cross-section in the deactivated and/or activated configuration. The internal bore 16 may for receiving a transition portion of the longitudinal member 12/s. The sleeve is configured to accommodate a plurality of cross-sectional profiles and/or diameters in the internal bore 16 in the activated configuration. Accordingly, the connector 10 is connected over a knuckle, joint, valve or other profile change in the longitudinal member 12/s. The sleeve is configured to accommodate a plurality of cross-sectional profiles and/or diameters in the internal bore 16 in the deactivated configuration. Accordingly, the connector 10 is moved over a knuckle, joint, valve or other profile change in the longitudinal member 12/s; such as by sliding the connector 10 axially relative to the longitudinal member 12 (or vice versa).

The connector 10 is configured to accommodate longitudinal member 12s of different cross-section or different diameter. For example, the connector 10 comprises a first internal bore 16 diameter in a first activated configuration for use with a first longitudinal member 12 in first application, such as a first downhole operation; and the connector 10 comprises a second internal bore 16 diameter in a second activated configuration for use with a second longitudinal member 12 in second application, such as a second downhole operation. The first longitudinal member 12 comprises a different diameter (e.g. different outer diameter) than the second longitudinal member 12.

The connector 10 may grip the longitudinal member 12 longitudinally. The grip applied by the connector 10 may allow a transmission of longitudinal forces between the connector 10 and the longitudinal member 12. The longitudinal forces is transmitted in both longitudinal directions (e.g. both uphole and downhole). Equal longitudinal forces is transmitted in both longitudinal directions (i.e. the connector 10 may provide bidirectional longitudinal grip of similar magnitude in each direction). The longitudinal forces is tensile and/or compressive.

Additionally, or alternatively, the connector 10 may grip the longitudinal member 12 rotationally. The grip applied by the connector 10 may allow a transmission of torque between the connector 10 and the longitudinal member 12. The torque is transmitted in both rotational directions (e.g. both clockwise and counter-clockwise). Equal torque is transmitted in both rotational directions (i.e. the connector 10 may provide bidirectional rotational grip of similar magnitude in each direction).

The connector 10 comprises a connector 10 for connecting a device or apparatus to the longitudinal member 12. For example, the connector 10 comprises a downhole tool connector 10 for connecting a downhole tool to the longitudinal member 12, such as connecting a downhole tool in a downhole toolstring.

Additionally, or alternatively, the connector 10 comprises a connector 10 for connecting a first longitudinal member 12 to a second longitudinal member 12, such as at end portions of each of the longitudinal member 12s. For example, the connector 10 is for connecting two longitudinal member 12s together, such as to effectively provide a longitudinal member 12 of increased length. The first and second longitudinal member 12s is of a similar type. Alternatively, the connector 10 is for connecting a first longitudinal member 12 of a first type to a second longitudinal member 12, the second longitudinal member 12 being of a dissimilar type to the first type. For example, the first and second longitudinal member 12s comprises a conductive and a non-conductive longitudinal member 12 respectively. The first and second longitudinal member 12s is of similar diameter. Alternatively, the first and second longitudinal member 12s is of dissimilar diameter. The first and second longitudinal member 12s is of similar cross-sectional profile. Alternatively, the first and second longitudinal member 12s is of dissimilar cross-sectional profile. For example, the connector 10 is for connecting a circular cross-sectional profile to an oval cross-sectional profile.

The connector 10 is configured to connect two longitudinal member 12s of similar cross-sectional profile and similar diameter; and configured to connect two longitudinal member 12s of dissimilar cross-sectional profile or dissimilar diameter. For example, the connector 10 is adaptable to accommodate similar longitudinal member 12s and also to accommodate dissimilar longitudinal member 12s.

The connector 10 is self-adapting, automatically adjusting to accommodate similar cross-sectional profiles and/or dissimilar cross-sectional profiles.

The internal bore 16 comprises a throughbore. Alternatively, in at least some examples, the internal bore 16 comprises a blind bore. For example, the connector 10 is connectable at a terminal or end point of a longitudinal member 12.

The longitudinal member 12 comprises one or more of: a cable, a tube, a support member, a downhole longitudinal member 12, an elongate member, a wire, a hollow longitudinal member 12; a conduit; a pipe; a coiled tubing; a slickline; a wireline; a tubular; a downhole tool.

In at least some examples, a material of the gripping sleeve 14 is selected according to the longitudinal member 12 to be gripped. The gripping sleeve 14 comprises a material and a coating configured to grip the longitudinal member 12. The gripping sleeve 14 comprises a material and coating to locally deform the longitudinal member 12 at only a microscopic scale; such as a sub-millimetre scale. In various examples, the filaments 18 of the gripping sleeve 14 comprise one or more of: a resilient material; a resilient coating: a high-friction material; a high-friction coating; an abrasive; a diamond-based material; a crystalline material; saw wire; metal; steel; diamond wire; diamond dust; diamond impregnation.

It will be appreciated that a system, such as a downhole toolstring, may comprise a plurality of connectors 10 located along the length of a single longitudinal member 12 (e.g. an axial repetition of the arrangement of FIGS. 1, 2 and 3).

Referring now to FIG. 4, there is shown a further example of a connector 110. The connector of FIG. 4 is generally similar to the connector of FIGS. 1, 2 and 3, with similar features denoted by similar reference numerals incremented by 100. Accordingly, the connector 110 comprises a downhole connector with a gripping sleeve 114 defining an internal bore 116 for receiving the longitudinal member therewithin.

As shown in FIG. 4, the connector 110 comprises a sealed fluid passage. The connector 110 comprises a plurality of seals 150, 152, 154. Where the connector 110 is for connecting two longitudinal members (not shown), such as two conduits, the provision of a sealed passage by the connector 110 enables increased functionality. For example, the connector 110 may provide a sealed connection between two lengths of tubular or coiled tubing, or between a length of coiled tubing and a fluid apparatus, such as a downhole valve, motor, or the like. Likewise, the connector 110 may function as a sealing sleeve, such as to seal an opening, leak, valve or the like in a longitudinal member located in the internal bore 116.

It will be appreciated that any of the aforementioned apparatus may have other functions in addition to the mentioned functions, and that these functions may be performed by the same apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present disclosure may consist of any such individual feature or combination of features. It should be understood that the embodiments described herein are merely exemplary and that various modifications may be made thereto without departing from the scope of the disclosure. For example, it will be appreciated that although shown here as a singular gripping sleeve with a single collar at each end and a singular gripping portion therebetween, in other examples collars may be provided at intermediate portions of a sleeve and/or additional collars may be provided such as to provide multiple gripping portions.

Similarly, although shown here as being axially insertable and removable from the longitudinal member, in at least some examples, the connector is laterally removable and/or laterally mountable.

The invention claimed is:

1. A connector for connecting to a downhole longitudinal member, the connector comprising:
   a first housing portion including a first end, a second end, and a first passage portion extending between the first end and the second end, the second end supporting an adjuster;
   a second housing portion extending through the adjuster into the first passage portion, the second housing portion including a second passage portion having an opening receptive of the downhole longitudinal member, wherein one of the first housing portion and the second housing portion is shiftable relative to the other of the first housing portion and the second housing portion; and
   a gripping sleeve including a first end secured to the first housing portion and a second end secured to the second housing portion, the gripping sleeve extending through the first passage portion and the second passage portion and defining an internal bore for receiving the downhole longitudinal member therewithin; wherein the gripping sleeve is configured to grip the longitudinal member when the one of the first housing portion and the second housing portion is shifted axially away from the other of the first housing portion and the second housing portion through operation of the adjuster.

2. The connector according to claim 1, wherein the gripping sleeve comprises a cylindrical helically wound braid.

3. The connector according to claim 1, wherein the gripping sleeve comprises at least one filament which is helically arranged around the internal bore.

4. The connector according to claim 1, wherein the gripping sleeve comprises a flexible sleeve configured to radially contract with axial extension of the gripping sleeve, the gripping sleeve reducing the diameter of the internal bore as the gripping sleeve is longitudinally extended in the axial direction of the internal bore.

5. The connector of claim 1, wherein each of the first and second housing portions comprises a respective rigid collar and the first and second axial openings both comprise a fixed diameter that remains the same throughout connection and/or disconnection and/or reconnection.

6. The connector of claim 1, wherein the adjustor adjusts a the separation between the first housing portion and the second housing portion, the adjustor being selectively operable to connect the connector to the downhole longitudinal member by pushing the first and second housing portions axially away from each other.

7. The connector of claim 6, wherein the connector is activated by rotating the adjustor relative to at least one of the first and second housing portions.

8. The connector of claim 7, wherein a rotational position of the first and second housing portions is fixed relative to each other.

9. The connector of claim 1, wherein the connector is configured to generate tension in the gripping sleeve by generating a tension force in the first housing portion and the second housing portion.

10. The connector of claim 1, wherein the grip of the gripping sleeve on the longitudinal member is maintained when tension on the longitudinal member is decreased.

11. The connector of claim 1, wherein the connector is deactivatable independently of tension in the longitudinal member.

12. The connector of claim 1, wherein the connector is reconnectable to the longitudinal member without requiring removal of the longitudinal member from within the internal bore.

13. The connector of claim 1, wherein the connector is configured to connect a first longitudinal member to a second longitudinal member.

14. The connector according to claim 1, wherein the downhole longitudinal member comprises one or more of: a cable, a tube, a support member, a wire, a hollow longitudinal member; a conduit; a pipe; a coiled tubing; a slickline; a wireline; a tubular; a downhole tool.

15. A method of connecting a connector to a downhole longitudinal member, the method comprising:
   receiving the longitudinal member within one of a first passage portion of a first housing portion and a second passage portion of a second housing portion slidingly received by the first passage portion;

guiding the longitudinal member into an internal bore of a gripping sleeve extending through the first passage portion and the second passage portion; and gripping the longitudinal member by sliding in an axial direction one of the first housing portion and the second housing portion relative to the other of the first housing portion and the second housing portion with an adjuster thereby lengthening the gripping sleeve.

16. The method of claim 15, comprising gripping the longitudinal member with a cylindrical helically wound braid.

17. The method of claim 15, comprising increasing grip on the longitudinal member independently of tension in the longitudinal member.

18. The method of claim 15, comprising increasing grip on the longitudinal member by reducing an internal diameter of the internal bore by lengthening the gripping sleeve, without applying any net axial force to the longitudinal member.

19. The method of claim 15, comprising rotating the adjustor that cooperates with at least one of the first housing portion and the second housing portion to push apart the first and second housing portions and increase a compressive force on the longitudinal member.

20. The method of claim 15, comprising disconnecting the connector from the longitudinal member by moving the first and second housing portions axially towards each other.

21. The method of claim 15, comprising decreasing grip on the longitudinal member independently of tension in the longitudinal member.

22. The method of claim 15, comprising moving the connector in a disconnected configuration axially along the longitudinal member, without removing the longitudinal member from the internal bore.

23. The method of claim 15, comprising reconnecting the connector to the longitudinal member.

* * * * *